US012762109B2

(12) United States Patent
Byrne et al.

(10) Patent No.: US 12,762,109 B2
(45) **Date of Patent: *Oct. 13, 2026**

(54) NOTIFICATIONS OF EVENTS OF A SYSTEM OF RECORD

(71) Applicant: DevRev, Inc., Palo Alto, CA (US)

(72) Inventors: Brian Byrne, Issaquah, WA (US); Victor Kamanga, Austin, TX (US); Amisha Kothari, Bengaluru (IN)

(73) Assignee: DevRev, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/202,519

(22) Filed: May 8, 2025

(65) Prior Publication Data

US 2025/0363087 A1 Nov. 27, 2025

Related U.S. Application Data

(63) Continuation of application No. 18/488,810, filed on Oct. 17, 2023, now Pat. No. 12,306,822.

(51) Int. Cl.

| | |
|---|---|
| ***G06F 16/00*** | (2019.01) |
| ***G06F 9/54*** | (2006.01) |
| ***G06F 16/22*** | (2019.01) |
| ***G06F 16/23*** | (2019.01) |

(52) U.S. Cl.
CPC .......... *G06F 16/2358* (2019.01); *G06F 9/542* (2013.01); *G06F 16/22* (2019.01)

(58) Field of Classification Search
CPC ............................. G06F 16/2358; G06F 16/22
See application file for complete search history.

(56) References Cited

U.S. PATENT DOCUMENTS

| | | | | |
|---|---|---|---|---|
| 6,611,877 B2 * | 8/2003 | Korn | G06F 11/3072 719/318 |
| 6,910,070 B1 * | 6/2005 | Mishra | H04L 67/14 709/227 |
| 7,379,999 B1 * | 5/2008 | Zhou | G06F 11/3495 709/224 |
| 8,566,311 B2 * | 10/2013 | Ordille | H04M 3/465 707/733 |

(Continued)

OTHER PUBLICATIONS

Vishnevskiy, S.,, "How Discord Stores Billions of Messages", Engineering & Design, Dated Jan. 2017.

(Continued)

*Primary Examiner* — Noosha Arjomandi
(74) *Attorney, Agent, or Firm* — Vista IP Law Group, LLP

(57) ABSTRACT

Techniques for notifying users of events for objects in a system of record are described. A request to generate the event is received. The event is indicative of a modification of an object. The event is recorded in a timeline table for a timeline of the object. Based on the modified object in the timeline table and a user table, one or more users may be identified. Further, the event is classified to determine a notification type of the one or more users from the user table. All interested users are selected from the one or more users and notified of the event. In an example, the system automatically subscribes users to receive notification of the occurrence of an event for the object. In an example, the one or more users may request to stop receiving the notification of the occurrence of the event for the object.

18 Claims, 10 Drawing Sheets

(56) References Cited

U.S. PATENT DOCUMENTS

| | | | | |
|---|---|---|---|---|
| 10,185,559 | B2* | 1/2019 | Schreiber | G06F 11/3668 |
| 10,503,822 | B1* | 12/2019 | Spencer | G06F 40/197 |
| 11,030,579 | B1* | 6/2021 | Campbell | G06Q 10/10 |
| 11,210,278 | B1* | 12/2021 | Dean | G06F 16/2453 |
| 11,314,573 | B2* | 4/2022 | Kedlaya | H04L 41/0631 |
| 11,561,849 | B1 | 1/2023 | Kairali | |
| 12,380,062 | B1 | 8/2025 | Rao | |
| 2003/0204517 | A1 | 10/2003 | Skinner | |
| 2005/0013257 | A1* | 1/2005 | Garyfalos | G06F 9/542 370/252 |
| 2005/0038791 | A1* | 2/2005 | Ven | H04L 67/1095 |
| 2006/0206890 | A1* | 9/2006 | Shenfield | G06F 8/20 717/174 |
| 2006/0236254 | A1* | 10/2006 | Mateescu | G06F 8/75 715/762 |
| 2011/0314382 | A1* | 12/2011 | Sweeney | G06F 16/36 709/202 |
| 2012/0124584 | A1 | 5/2012 | Addala | |
| 2013/0066980 | A1* | 3/2013 | Vasters | H04L 69/40 709/206 |
| 2013/0067024 | A1* | 3/2013 | Vasters | G06F 9/542 709/217 |
| 2014/0195670 | A1* | 7/2014 | Jain | H04L 67/025 709/224 |
| 2015/0142753 | A1* | 5/2015 | Soon-Shiong | G06F 16/2272 707/673 |
| 2016/0277351 | A1* | 9/2016 | Wang | G06F 16/335 |
| 2017/0124569 | A1* | 5/2017 | Revelle | G06Q 20/401 |
| 2018/0152358 | A1* | 5/2018 | Chheda | G06F 11/3048 |
| 2019/0068526 | A1 | 2/2019 | Xie | |
| 2020/0082104 | A1* | 3/2020 | Hwang | G06F 21/604 |
| 2020/0134062 | A1* | 4/2020 | Kishi | G06F 16/285 |
| 2020/0159570 | A1 | 5/2020 | Askeland | |
| 2020/0201837 | A1* | 6/2020 | Motwani | G06F 16/381 |
| 2020/0364185 | A1 | 11/2020 | Beier | |
| 2021/0056131 | A1* | 2/2021 | Ackermann | G06F 16/383 |
| 2021/0200741 | A1* | 7/2021 | Frenkel | G06F 16/2358 |
| 2022/0197777 | A1* | 6/2022 | Souders | G06F 11/3628 |
| 2022/0197778 | A1* | 6/2022 | Souders | G06F 7/588 |
| 2022/0303127 | A1 | 9/2022 | Khoury | |
| 2023/0143636 | A1* | 5/2023 | Busjaeger | G06F 16/24552 707/625 |
| 2023/0214739 | A1* | 7/2023 | Kulkarni | G06Q 10/063114 705/7.15 |
| 2023/0246929 | A1 | 8/2023 | Shiraishi | |
| 2024/0220484 | A1 | 7/2024 | Challa | |
| 2024/0244126 | A1* | 7/2024 | Hsiao | H04L 43/028 |

OTHER PUBLICATIONS

Discord, Channels Resource, Discord Developer Portal—Date retrieved from Google, Sep. 2024.

Slack, conversations.history , URL:4 https://api.slack.com/methods/conversations.history, Dated May 2019.

Slack, Retrieving Messages, Date retrieved from Google, Nov. 2020.

Slack, chat.postMessage, Slack API, URL: https://api.slack.com/methods/chat.postMessage, Date retrieved from Google, Jan. 2014.

Slack, "Manage notification for specific channels and direct messages", Slack help center, Dated Dec. 2020.

Notice of Allowance dated Sep. 28, 2024 for U.S. Appl. No. 18/488,810.

Notice of Allowance dated Jan. 29, 2024 for U.S. Appl. No. 18/488,810.

Arnab Chatterjee, "Implementing Real-Time Notifications Using Redis Pub/Sub", Arnab's Blog, dated, May 28, 2023.

Tugdual Grall, "How to Create Notification Services with Redis, Websockets, and Vue.js", URL: https://redis.io/blog/how-to-create-notification-services-with-redis-websockets-and-vue-js/, dated Aug. 19, 2020.

Non-Final Office Action dated Apr. 16, 2026, for U.S. Appl. No. 18/488,822.

* cited by examiner

500

| OBJECT IDENTIFIER 502 | TIMESTAMP 504 | USER IDENTIFIER 506 | EVENT TYPE 508 |
|---|---|---|---|
| issue/100 | 1689026348 | devu/20 | “comment” |
| issue/100 | 1689027122 | sysu/1 | “change_event” |
| issue/100 | 1689027894 | revu/500 | “comment” |

Fig. 5

600

| OBJECT IDENTIFIER 602 | USER IDENTIFIER 604 | NOTIFICATION TYPE 606 | FROZEN FLAG 608 |
|---|---|---|---|
| issue/100 | devu/20 | changes + mentions + discussions | false |
| issue/100 | devu/50 | (empty) | true |
| issue/100 | revu/500 | mentions + discussions | false |

Fig. 6

NOTIFICATIONS OF EVENTS OF A SYSTEM OF RECORD

CROSS-REFERENCE TO RELATED APPLICATIONS

The present application is a continuation of U.S. patent application Ser. No. 18/488,810 filed on Oct. 17, 2023, which is hereby incorporated by reference in its entirety.

BACKGROUND

Generally, many companies or organizations develop products or provide services for various purposes. For instance, an organization may develop a product, such as an application, for providing end-to-end messaging services for enabling communication through messaging between one or more users. In some cases, the same and/or different organizations may provide services. Particularly, one or more units within the companies or organizations or different companies or organizations may provide services, such as solutions to problems faced by users of the application using customer-relationship management tools, handling customer sales using billing systems, and the like. The typical product or service touches upon, inhabits, or interrelates with numerous disparate locations, devices, and/or entities that pertain to the product or service. Each of these different locations, devices, and entities may inhabit its own compartmentalized ecosystem that is distinct from—and effectively walled off from—any of the other compartmentalized ecosystems.

Each of these ecosystems produces a stream of events that describe some activity or change thereof. The events are unique to each ecosystem, such as a product development ecosystem or a service ecosystem. The events may reference one or more entities that span across the ecosystems.

BRIEF DESCRIPTION OF DRAWINGS

The detailed description is provided with reference to the accompanying figures. In the figures, the leftmost digit(s) of a reference number identifies the figure in which the reference number first appears. The same numbers are used throughout the drawings to reference like features and components.

FIG. 5 illustrates a timeline table for a timeline for an object, according to an example implementation of the present subject matter;

FIG. 6 illustrates a user table maintained by the back-end consumer, according to an example implementation of the present subject matter;

DETAILED DESCRIPTION

Figure 1:
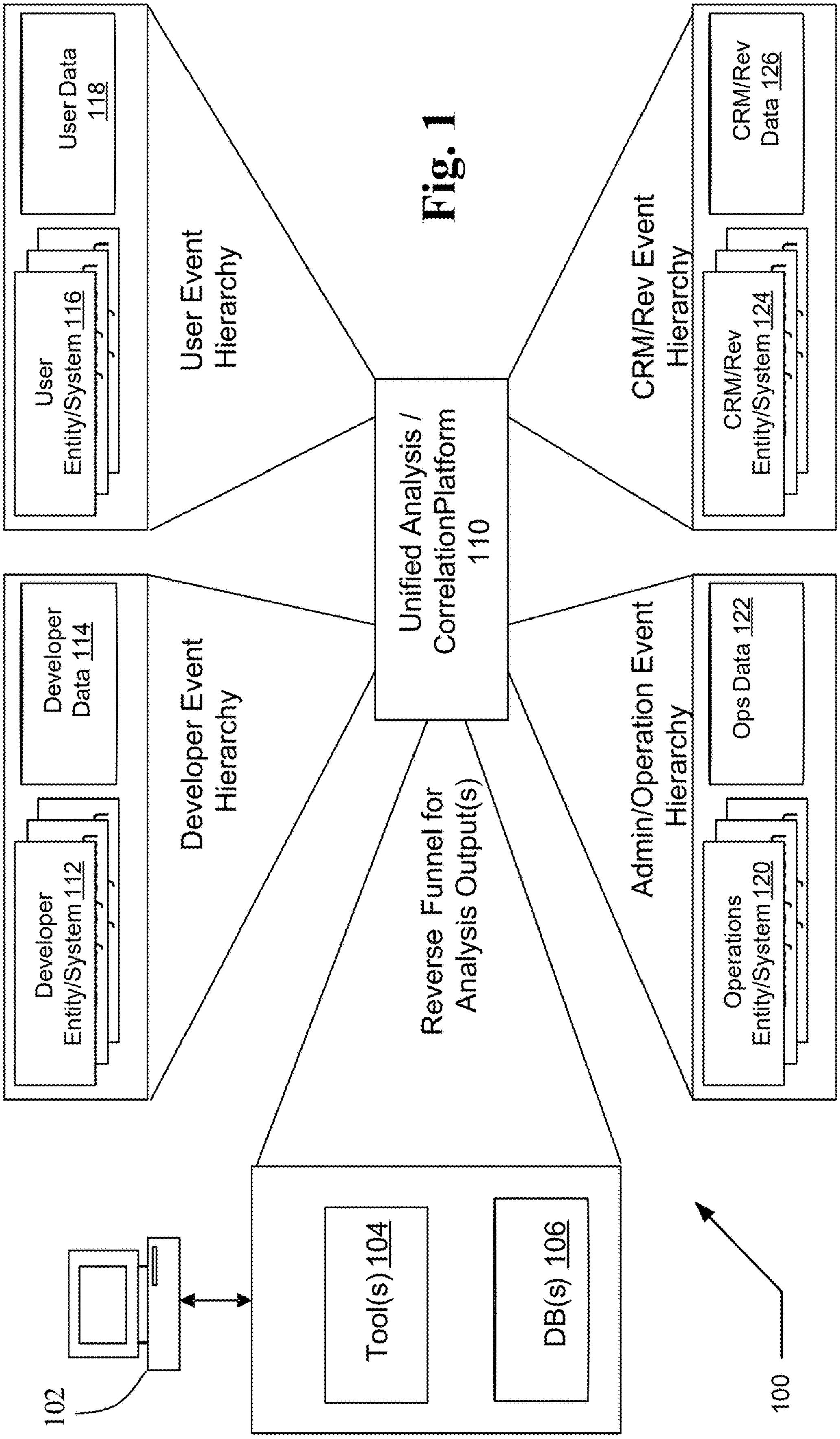
FIG. 1 illustrates a system 100 for propagation of events, according to an example implementation of the present subject matter.

A system of record includes events that are related to product development ecosystems, services ecosystems, or the like. Particularly, the system of record includes a plurality of objects and a high volume of events associated with each object. For instance, the system of record may include events, such as to track work about a product of a company, various operations being performed within a company, track issues on an application developed using development tools, track bugs in the application developed, track interactions with users of product of companies, track tickets raised by users, track sales leads, potential customers, and the like.

In this regard, when an update to an object is made, an event is generated. The event may have to be disseminated reliably to the appropriate users that are interested in the object associated with the event. For example, assume that a user of an application raises a ticket to flag an issue with the application. Further, assume that a developer is responsible for addressing or fixing the issue. In this regard, when the user raises the ticket, the developer must receive an alert to notify that the ticket related to the application has been raised. This must be done reliably to minimize any delay in resolving the ticket and to minimize any latency in addressing the issue.

Generally, in conventional scenarios, since the ecosystems, such as the product development ecosystems, services ecosystems, or the like, are typically isolated from one another, it is normally not possible to adequately or effectively provide alerts or notifications regarding events or objects that crosses the boundaries of these isolated ecosystems. Conventional approaches taken by service organizations face impediments to effectively extract value from these events and to respond to them efficiently. For example, one conventional approach is to use a manual process to analyze the event, where a significantly high level of human effort is required to individually analyze these events and to act on them appropriately. This human-based approach is both costly and reactive rather than proactive, and tends to suffer from the inability of humans to be able to accurately and efficiently process high volumes of events. Further, in conventional systems, there is a delay in processing of events and providing an alert or a notification for the occurrence of the event, thereby, making such conventional systems to have high-latency and/or be inefficient.

Further, in order to provide an alert or a notification, it is essential to ascertain whom all to notify regarding an update in the event. In an example, one or more users may want to receive notifications of events for objects that they are interested in. In another example, one or more users may want to receive notifications of events for a particular object for a required time period. In such scenarios, one or more users may want to stop receiving notifications after their requirement is over and when they are no longer interested in the object. In this regard, if there are large number of objects and high volume of events, a system that processes and notifies events to appropriate users in an efficient manner may have to be provided.

The present subject matter provides systems and methods for processing events for a system of record. The present subject matter provides techniques that notify the events to appropriate users quickly and efficiently. A user, such as one or more clients making a request to generate an event, may make a modification of an object corresponding to data in a system of record.

The system of record may include objects and associated events, such as to track work about a product of a company, various operations being performed within a company, track issues on an application developed using development tools, track bugs in the application developed, track interactions with users of product of companies, track tickets raised by users, track sales leads, potential customers, and the like. Each object in the system of record has its own history of changes, related events, and discourse surrounding them. A timeline may be used for recording the events associated with the objects. In an example, the events may be recorded in a timeline table for the timeline of the object.

When a modification is made to an object in the system of record, an event may be generated. The modification may be any changes to the object, an update of the object, addition of a comment to the object, and the like. For instance, a user may request to modify a ticket. The ticket may refer to an underlying defect with a product or a service. In an example, the user may make a modification by requesting to change the priority of the ticket. Accordingly, such modification to the ticket may generate an event. The user may request for changing the priority of a ticket from the lowest priority (for example, P4) to the highest priority (for example, P1) regarding an issue in the product or the service. In another example, the user may make the modification by commenting on the ticket. In an example, the user may make a comment by referencing a particular user "X". For instance, the comment may be "Can you take a look at this @X?". Accordingly, such modification to the ticket may generate an event.

The system may process the request for modification of the object to obtain a modified object and then record the event in a timeline database for a timeline of the object, wherein the event is recorded in the timeline database in a timeline table. In the timeline table, the event may be recorded with attributes comprising an object identifier, a timestamp, a user identifier, and an event type. In an example, the timeline table illustrates events in the history of the object and may be referenced and iterated efficiently for the object.

Further, one or more users may be identified based on the modified object in the timeline table and a user table. For instance, the one or more users may be users who are already subscribed to receive a notification of the occurrence of the event for the object. The one or more users may also be the users who are referenced in the comment by the user. For example, for the comment "Can you take a look at this @X?" by the user, the identified user is "X". In an example, the one or more users may be users who are interested in receiving notification for the occurrence of any event related to the object. In an example implementation, the system maintains a user table. In the user table, the event may be recorded with attributes comprising an object identifier, a user identifier, a notification type, and a frozen flag.

The event is then classified to determine a notification type of the identified one or more users from the user table. The notification type is indicative of a user preference to receive the notification of the occurrence of the event for the object. In an example, as objects are modified, the interested users, such as users that are referenced in the object, users who have created a comment on the object are identified and automatically subscribed to receive notifications. In another example, the subscribed users to receive notifications may opt-out from receiving the notifications for the object. For instance, in an opt-out scenario, the notification type is removed from the user's set, and then the "frozen" is set to 'true' to prevent further modifications to the notification types from happening. In another instance, in an opt-out scenario, a flag, such as a notification type, is removed from the subscribed user to stop receiving the notification.

Further, interested users are selected from the one or more users based on the user preferences indicated in the notification type of the user table. A notification service enables notifying the interested users of the corresponding event of the object.

In the present subject matter, the notification for the events for one or more objects are transmitted reliably to the one or more users. In one example, the one or more users may be interested and/or trusted users. Therefore, the present subject matter ensures that the one or more users, subscribed to the object, receive the notification of occurrence of an event for the object. The present subject matter may efficiently monitor a subset of events and may generate notifications from modified objects derived from an object's timeline, thereby increasing the efficiency of the system. Further, the present subject matter directs the notification towards a set of users, such as interested users, thereby utilizing the network resources efficiently.

Furthermore, each object in the system of record in the present subject matter is handled independently by the system, and therefore scalability of the system is not affected as more objects are added in the system of record. The present subject matter provides a flexible system as the event may be monitored automatically by the system based on object activity without any user intervention. In addition, based on the activity, such as modification of the objects, the interested users, such as users that are referenced in the object, who have created a comment on the object are identified and automatically subscribed to receive notifications. Further, the subscribed users may override the subscribed settings by opting-out of notifications for the object. The present subject matter thus provides a highly scalable and efficient technique for processing and notifying events to appropriate users in an efficient manner.

FIG. 1 illustrates a system 100 to process and integrate data and events from disparate ecosystems pertaining to products or services. In systems, such as development of customer relations management (CRM) systems, developer (hereinafter referred to as "Dev") side is greatly isolated from their users/customers (hereinafter referred to as "Rev") side. Accordingly, the system 100, by removing barriers between the "Dev" side and the "Rev" side, easily connects code on the Dev side to production issues and user/customer interactions on the Rev side. Accordingly, the system 100 permits software development to no longer have to work across silos of different systems to meaningfully communicate and collaborate with their software users and customers.

The system 100 provides a unified platform 110 to implement an automated template for autonomous clustering of events into event hierarchies as well as autonomous classification and communication between these hierarchies. The term "event hierarchy" may also be referred to herein as a "funnel", since the operation of the system 100 involves the funneling of large amounts of events from the different hierarchies for processing by the unified platform 110.

Any number or type of event hierarchies may be acted upon by embodiments of the invention. For example, the figure illustrates event hierarchies pertaining to developer entities/systems 112, user entities/systems 116, CRM/Revenue-based entities/systems 124, and admin/operator entities/systems 120. The developer entities/systems 112 may correspond to developer data 114, the user entities/systems 116 may correspond to user data 118, the CRM/Revenue-based entities/systems 124 may correspond to CRM/Rev data 126, and the admin/operator entities/systems 120 may correspond to Ops ("operations") data 122.

In some examples, the unified platform 110 uses machine-learning based techniques to automatically process the data and events from the multiple event hierarchies, and to generate one or more databases 106 comprising both raw data and properly categorized data so that analysis tools 104 can be used to extract useful information and accurate results. In this way, a correlated view of the data can be obtained, despite the fact that the event data may originate from numerous disparate and separated systems, and despite the fact that the collected event data may correspond to an immense amount of information that is collected.

The approach, therefore, allows software and service organizations to focus their efforts on the most important issues in their product and to anticipate and resolve customer problems before they are reported. The present subject matter is applicable to any organization that develops products that are delivered to end customers in a manner such that the events are collected during the development, deployment and usage of the product to monitor the health of the product's ecosystem. This invention outlines an application of the inventive method for the Software-as-a-Service (SaaS) industry, but it is not limited to this industry.

The system 100 may include one or more user stations 102 to operate the unified platform 110. The user stations 102 and/or the servers that host or operate with the system 100 includes any type of computing device that may be used to implement, operate, or interface with the system. Examples of such devices include, for example, workstations, personal computers, mobile devices, servers, hosts, nodes, or remote computing terminals. The user station 102 may include a display device, such as a display monitor, for displaying a user interface to users at the user station 102. The user station 102 may include one or more input devices for the user to provide operational control over the activities of the system 100, such as a mouse or keyboard, to manipulate a pointing object in a graphical user interface to generate user inputs. The database system may be communicatively coupled to a storage apparatus (e.g., a storage subsystem or appliance) over a network. The storage apparatus comprises any storage device that may be employed by the database system to hold storage content.

Embodiments of the invention operate by progressing objects within the system through a series of stages that will "funnel" the data into more meaningful sets of analyzed data as the objects progress through the different stages. The raw data from the various Dev and Rev sources are likely to correspond to an extremely large volume of data, which individually by themselves may not provide enough cross-hierarchy context to be meaningful. That large volume of raw data, when analyzed in a unified way across the different hierarchies, may be used to form increasingly smaller and more meaningful sets of data that can be usefully provided to developers, users, managers, and/or any other party that can benefit from a unified cross-hierarchy view of events and data within the system.

Figure 2:
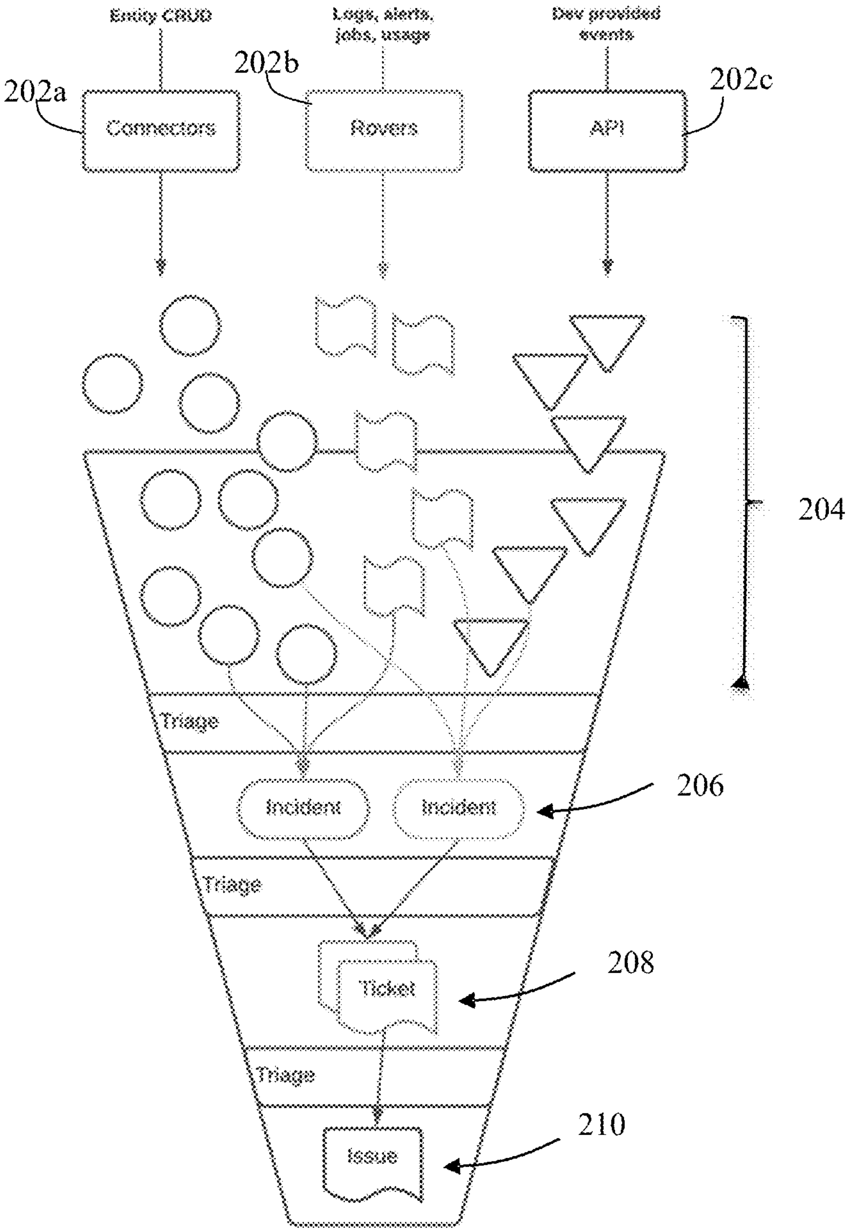
FIG. 2 illustrates concept of an event funnel, sources, and stages as an object may progress through the system, according to an example implementation of the present subject matter.

FIG. 2 illustrates the concept of an event funnel, sources, and stages as an object may progress through the system. Within this diagram, events 204 are generated or consumed from multiple event sources. These sources can be acquired using any suitable mechanisms or technique. For example, the events may be acquired using connectors 202*a*, rovers 202*b*, and/or using the unified platform's Application Programming Interface (API) 202*c*.

The connectors 202*a* may provide bi-directional communications to an entity that provides data. For example, the connectors 202*a* may be used with respect to entity CRUD ("create, read, update, delete") operations. The rovers 202*b* may be used to implement pure collections activities in a single direction from the Dev or Rev entities, e.g., to collect logs, alerts, jobs, and usage data from an entity. The API 202*c* may be used to implement programmatic access to event data, e.g., for Dev provided events.

The events 204 then progress through the event funnel where a series of models are applied to cluster and classify the events into items of interest. For example, at a first funneling stage, events of interest (e.g., which are correlated from across multiple event hierarchies) may be clustered into incidents 206. In a subsequent funneling stage, incidents that require human or machine interactions may lead to creation of a ticket 208. Any tickets that are deemed actionable enough may be used to create an issue 210. For example, an issue may be created if a production and/or service change is deemed necessary based upon a ticket.

Figure 3:
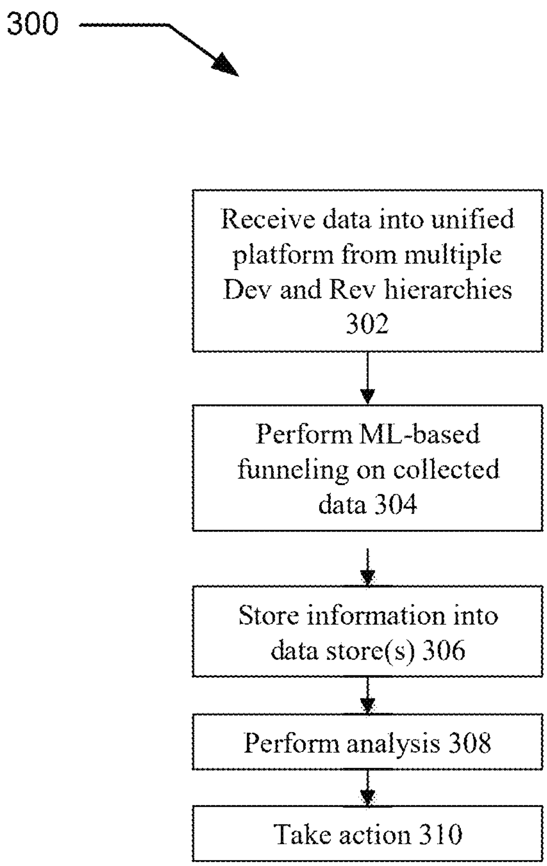
FIG. 3 shows a high-level flowchart for processing actions, according to an example implementation of the present subject matter.

FIG. 3 shows a high-level flowchart 300 for processing actions that are implemented according to some embodiments of the invention. At step 302, data is received into the unified platform from a plurality of Rev and Dev hierarchies. As previously noted, any suitable collection mechanism may be used to obtain the data from the different event hierarchies, such as, for example, collectors, rovers, and through an API.

At step 304, processing is performed upon collected data. In particular, clustering and classification operations are implemented using the collected event data from across the multiple hierarchies. These clustering and classification operations are used to implement the funneling process to convert a large set/stream of event data into smaller and smaller sets of incident, ticket, and issue data.

At step 306, the output of the clustering, classification, and/or funneling operations are stored into one or more data storage locations and/or formats. For example, the analyzed data may be stored into a search/index store, a bulk store, an object database, and/or an analytics database.

At step 308, analysis may be performed using the collected data. For example, incidents, tickets, and issues that were identified in the preceding steps may be used to analyze and identify the root cause of a customer problem when addressing a software problem. At step 310, one or more actions may be taken as a result of performing the analysis upon the data. For example, a developer may implement a correction and/or patch to the software to resolve the identified customer error with the software.

Figure 4:
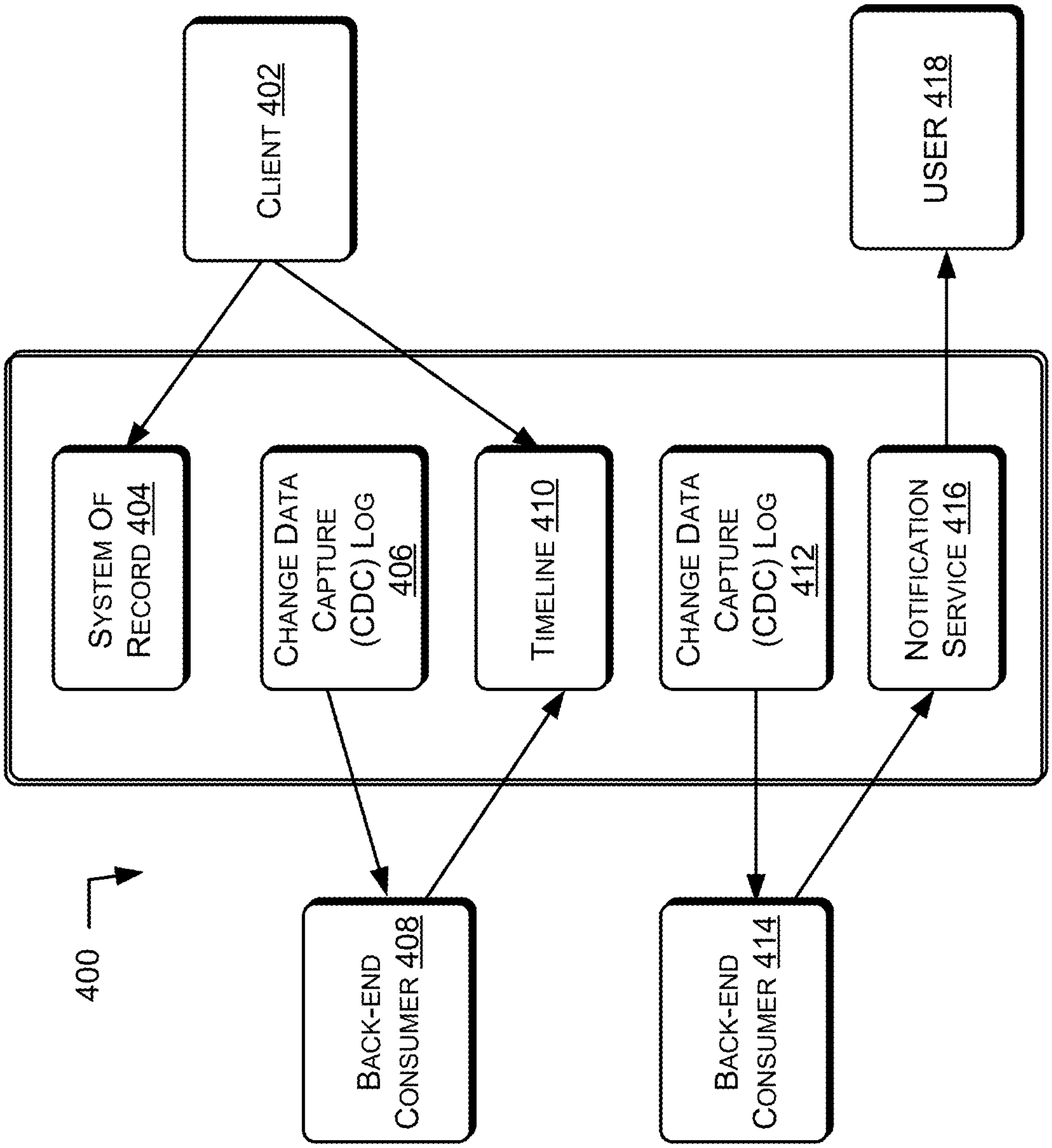
FIG. 4 illustrates a block diagram of a system for propagation of events of a system of record, according to an example implementation of the present subject matter.

FIG. 4 illustrates a block diagram of a system 400 for propagation of events of a system of record 404, according to an example implementation of the present subject matter. The system 400 may enable modification of an object and notification of an event for the object to the users, as will be explained below. In an example, for the notification of the event for the object to the users, the system 400 may include the system of record (SoR) 404 and a notification service 416.

The SoR 404 may include a plurality of objects and associated events. Each object in the SoR has its own history of changes, related events, and discourse surrounding them. In an example, a user may connect using a web browser or an application to make changes to an object corresponding to the system of record 404. The user may be referred to as a client 402 making a request to generate an event.

Particularly, the client 402 may make a modification to the object, such as changes to the object, an update of the object, addition of a comment to the object, and the like. In this regard, when the modification to the object is made, an event may be generated. The event may be included in the SoR 404. In an example, the SoR 404 may include objects, such as to track work about a product of a company, various operations being performed within a company, track issues on an application developed using development tools, track bugs in the application developed, track interactions with users of product of companies, track tickets raised by users, track sales leads, potential customers, and the like, and the events corresponding to the objects.

The SoR 404 may include a memory and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The client 402 may correspond to a computing device and may be and/or may include a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory, such as a volatile memory or a non-volatile memory, of the client.

During the lifetime of connection of the client 402 (e.g. the duration a web browser remains on a website or an application), the client 402 may modify an object, such as update the object or add a comment to the object. In this regard, when the modification to the object is made, an event may be generated. The event may be included in the SoR 404.

The system 400 may include a Change Data Capture (CDC) log 406 and a back-end consumer 408. The CDC log 406 may capture the generation of the event to indicate that the modification has been made in the object. The CDC log 406 may be stored in the memory of the SoR 404. The back-end consumer 408 monitors the modification in the object and updates the modification in the timeline 410 of the object. The back-end consumer 408 may be a computing device, and may be and/or may include a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory, such as a volatile memory or a non-volatile memory, of the back-end consumer 408.

The timeline 410 may be used for recording the history of changes, related events, and discourse associated with the objects. In an example, the timeline 410 records the event in a timeline table, as explained with reference to FIG. 5, for a timeline of the object. In the timeline table, the event may be recorded with attributes comprising an object identifier, a timestamp, a user identifier, and an event type. In an example, the timeline table illustrates events in the history of the object and may be referenced and iterated efficiently for the object. The timeline 410 may be stored in the memory of the SoR 404. In an example, when the client 402 makes a request to modify a ticket to generate an event, the timeline 410 records the ticket modification in the timeline table. In another example, the client 402 makes a request to modify the timeline 410. The modification may include addition of a comment by the client 402 in the timeline table of the object.

The system 400 further includes a Change Data Capture (CDC) log 412 and a back-end consumer 414. The CDC log 412 may capture the timeline table with the modified object. The CDC log 412 may be stored in the memory of the SoR 404. The back-end consumer 414 may classify the event. The back-end consumer 414 may be a computing device, and may be and/or may include a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory, such as a volatile memory or a non-volatile memory, of the back-end consumer 414.

In an example implementation, the back-end consumer 414 may maintain a user table, as explained with reference to FIG. 6. In the user table, the event may be recorded with attributes comprising an object identifier, a user identifier, a notification type, and a frozen flag In an example, the back-end consumer 414 may determine the user of the event. In another example, the back-end consumer 414 may ascertain whether a user, creating the request for the event, is included in the user table. In yet another example, the back-end consumer 414 may add the user in the user table upon ascertaining that the user is not included in the user table.

In an example implementation, the back-end consumer 414 identifies one or more users based on the modified object in the timeline table and the user table. For instance, the one or more users may be users who are already subscribed to receive a notification of the occurrence of the event for the object. The one or more users may also be the users who are referenced in the comment by the client 402. For example, for the comment "Can you take a look at this @X?" by the client 402, the identified user is "X". In an example, the one or more users may be users who are interested in receiving notification for the occurrence of any event related to the object.

In an example, the back-end consumer 414 classifies the event to determine a notification type of the identified one or more users from the user table. The notification type is indicative of a user preference to receive notifications of the occurrence of the event for the object. In an example, as objects are modified, the interested users, such as users that are referenced in the object, users who have created a comment on the object are identified and automatically subscribed to receive notifications. In another example, the subscribed users to receive notifications may opt-out from receiving the notifications for the object. For instance, in an opt-out scenario, the notification type is removed from the user's set, and then the "frozen" is set to 'true' to prevent further modifications to the notification types from happening. In another instance, in an opt-out scenario, a flag, such as a notification type, is removed from the subscribed user to stop receiving the notification. In an example, fora user to stop receiving notifications, the notification type of the user is updated to remove the type from the set. In such a scenario, the notification type may be set as "empty".

The notification service 416 selects the interested users 418 from the one or more users based on the user preferences indicated in the notification type of the user table. The notification service 416 enables notifying the interested users 418 of the corresponding event of the object. In an example, the notification service 416 determines the type of notification to be sent to the interested users 418. For instance, a notification may be a real-time notification.

FIG. 5 illustrates a timeline table 500 for a timeline for an object, according to an example. The history of the object since the creation of the object is captured and recorded in the timeline table of the object. In the timeline table 500, the event may be recorded with attributes comprising an object identifier 502, a timestamp 504, a user identifier 506, and an event type 508. For the timeline table, the data is partitioned by the object identifier 502, and sorted based on the timestamp 504. In an example, each event has a common metadata (e.g., creator of the event), and event-specific data depending on the event type 508. The event type 508 may be at least one of a discussion event, a reference event, and a change event. The discussion event may include a comment from the user of the event. The reference event may include mention of a user in a comment from the user. The change event may include any update in the object.

FIG. 6 illustrates a user table 600 maintained by the back-end consumer 414, according to an example. In the user table 600, the event may be recorded with attributes comprising an object identifier 602, a user identifier 604, a notification type 606, and a frozen flag 608. For the user table 600, data is partitioned by the object identifier 602 and sorted based on the user identifier 604. The event type of the timeline table may be mapped with the notification type of the user table. In an example, the back-end consumer 414 may ascertain whether a user is included in the user table. In yet another example, the back-end consumer 414 may add the user in the user table upon ascertaining that the user is not included in the user table. The notification type 606 in the user table 600 indicates the preferences of the user. For instance, the user may be interested in receiving notifications for the occurrence of any event for the object. In an example, the user may not be interested in receiving notifications for the occurrence of any event for the object. In such a scenario, the user may request to stop receiving the notification. A flag, such as a notification type, is removed from the subscribed user to stop receiving the notification. In an example, for a user to stop receiving notifications, the notification type of the user is updated to remove the type from the set. In such a scenario, the notification type may be set as "empty". For example, the user "devu/50" in FIG. 6 will receive no notifications as the notification type is set as "empty".

The frozen flag 608 indicates the user subscription preferences. In an example, the frozen flag 608 indicates whether the user should be automatically subscribed to receive notifications. The frozen flag may be set as 'true' to remove a desired notification type for the user and to remain unsubscribed to the notification type.

Figure 7:
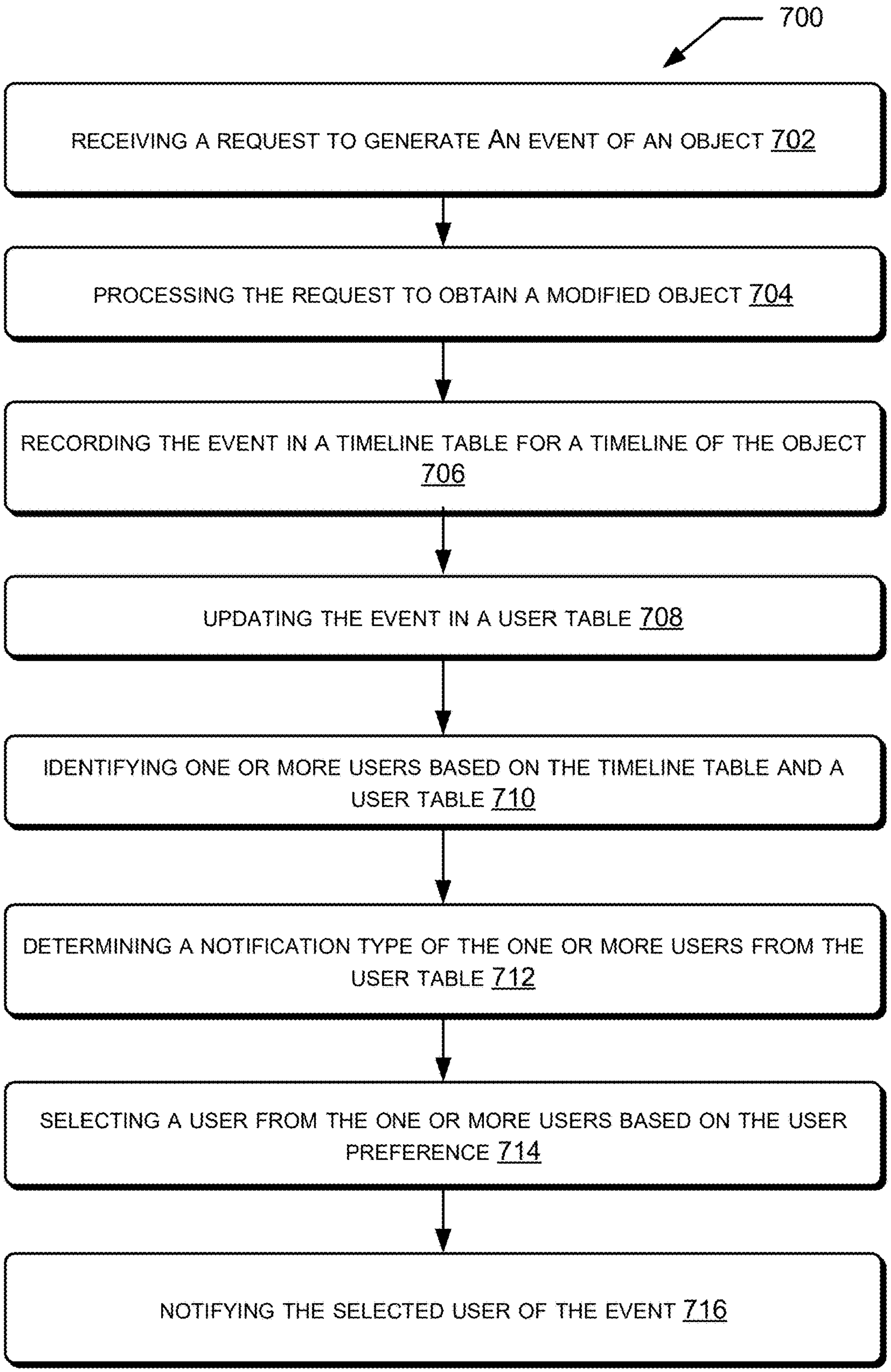
FIG. 7 illustrates a method for notifying an event to interested users for one or more objects in a connected environment having a plurality of distinct ecosystems, according to an example implementation of the present subject matter.

FIG. 7 illustrates a method 700 for notifying an event to interested users for one or more objects in a connected environment having a plurality of distinct ecosystems, according to an example implementation of the present subject matter. The order in which the method 700 is described is not intended to be construed as a limitation, and any number of the described method blocks may be combined in any order to implement the method 700, or an alternative method. Furthermore, the method 700 may be implemented by processor(s) or computing device(s) through any suitable hardware, non-transitory machine-readable instructions, or a combination thereof.

It may be understood that steps of the method 700 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 700 may be performed by the system 400.

At step 702, the method includes receiving a request to generate an event. A user, such as one or more clients, may make a request to generate the event. The event may be generated when a modification is made to an object in a system of record. For instance, the modification may be creating an update indicating a change in the object, creating a comment, such as a discussion and a reference in the object, and the like. For instance, the user may request to modify a ticket. The ticket may refer to an underlying defect with a product or a service. In an example, the user may make a modification by requesting to change the priority of the ticket. Accordingly, such modification to the ticket may generate an event. The user may request to change the priority of a ticket from the lowest priority (for example, P4) to the highest priority (for example, P1) regarding an issue in the product or the service. In another example, the user may make the modification by commenting on the ticket. In an example, the user may make a comment by referencing a particular user "X". For instance, the comment may be "Can you take a look at this @X?". Accordingly, such modification to the ticket may generate an event.

At step 704, the request for the modification of the object may be processed and a modified object may be obtained. At step 706, the method includes recording the event in a timeline table for a timeline of the object. The timeline may be used for recording the history of changes, related events, and discourse associated with the objects in the system of record. In an example, the timeline records the event in the timeline table, as explained with reference to FIG. 5, for a timeline of the object. In the timeline table, the event may be recorded with attributes comprising an object identifier, a timestamp, a user identifier, and an event type. The timeline table illustrates events in the history of the object and may be referenced and iterated efficiently for the object. In an example, the user may make a request to modify the timeline. The modification may include addition of a comment by the user in the timeline table of the object. The timeline table may be then published with the modified object. At step 708, the event may be updated in a user table.

Subsequently, at step 710, one or more linked users are identified based on the modified object in the timeline table and the user table. The one or more linked users may be users who are interested in receiving notification for the occurrence of any event related to the object. In an example, the one or more linked users may be users who are already subscribed to receive a notification of the occurrence of the event for the object. The one or more linked users may also be the users who are referenced in the comment by the user. For example, for the comment "Can you take a look at this @X?" by the user, the identified user is "X". In an example, the user table may be maintained to identify the one or more users for receiving notification for the occurrence of any event related to the object. In the user table, the event may be recorded with attributes comprising an object identifier, a user identifier, a notification type, and a frozen flag.

At step 712, the event may be classified to determine a notification type of the one or more linked users in the user table. The notification type may indicate a user preference to receive the notification of the occurrence of the event for the object. In an example, as objects are modified, the interested users, such as users that are referenced in the object, users who have created a comment on the object are identified and automatically subscribed to receive notifications. In another example, the subscribed users to receive notifications may opt-out from receiving the notifications for the object. For instance, in an opt-out scenario, the notification type is removed from the user's set, and then the "frozen" is set to 'true' to prevent further modifications to the notification types from happening. In another instance, in an opt-out scenario, a flag, such as a notification type, is removed from the subscribed user to stop receiving the notification.

Then, at step 714, all interested users may be selected from the identified one or more linked users based on the user preferences indicated in the notification type of the user table. Subsequently, at step 716, the selected interested user may be notified of the event of the object. In an example, the notification service may determine the type of notification to be sent to the selected interested users. For instance, a notification may be a real-time event propagation.

Figure 8:
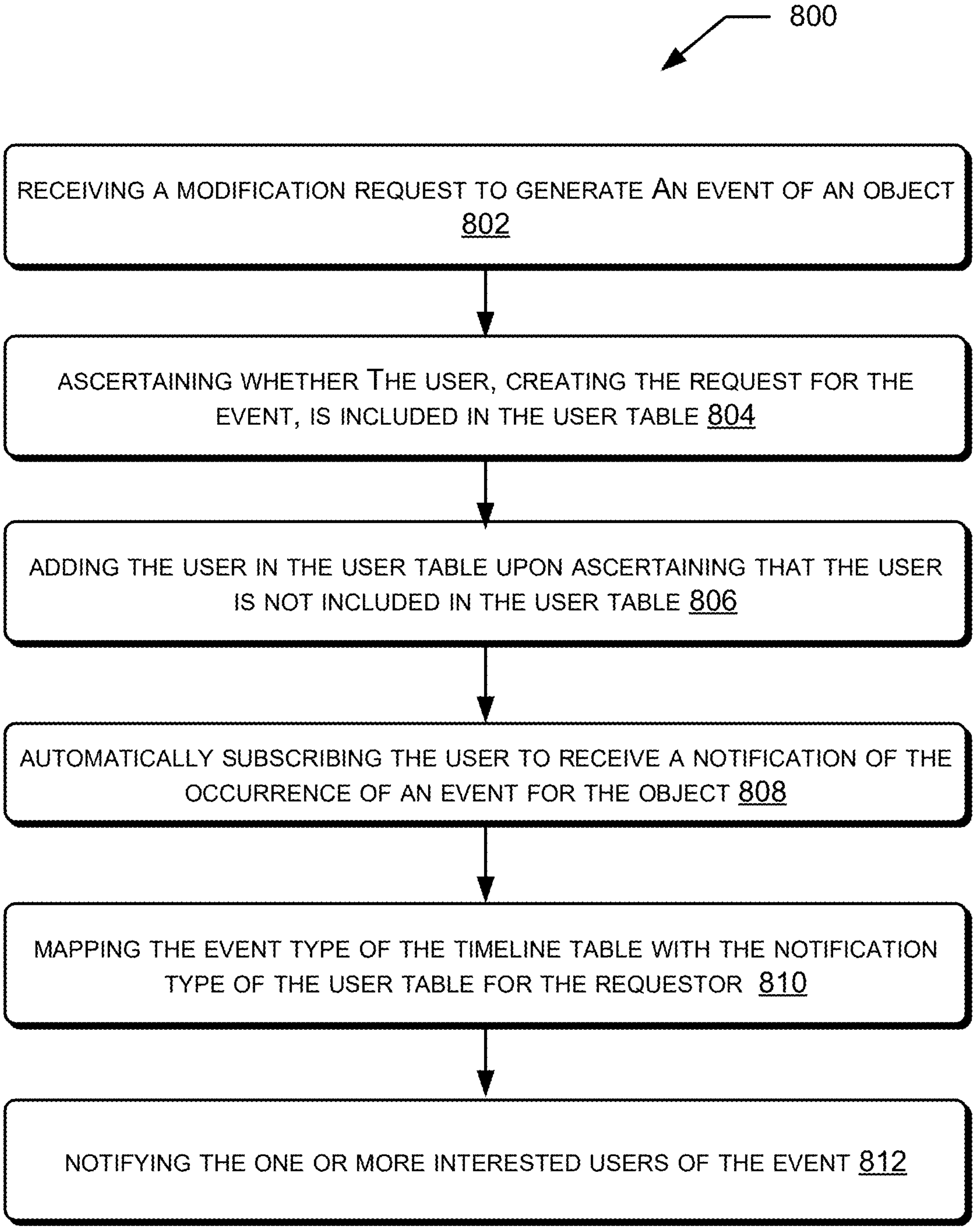
FIG. 8 illustrates a method for notifying an event to users for one or more objects, according to an example implementation of the present subject matter.

FIG. 8 illustrates a method 800 for notifying an event to users for one or more objects, according to an example implementation of the present subject matter. The order in which the method 800 is described is not intended to be construed as a limitation, and any number of the described method blocks may be combined in any order to implement the method 800, or an alternative method. Furthermore, the method 800 may be implemented by processor(s) or computing device(s) through any suitable hardware, non-transitory machine-readable instructions, or a combination thereof.

It may be understood that steps of the method 800 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 800 may be performed by the system 400.

At step 802, the method includes receiving a request to generate an event by a user. The user may be one or more new clients unknown to the system 400. The event may be generated when a modification is made to an object in a system of record. For instance, the modification may be creating an update indicating a change in the object, creating a comment, such as a discussion and a reference in the object, and the like. The request for the modification of the object may be processed, a modified object may be obtained, and the event may be recorded in a timeline table for a timeline of the object.

Then, at step 804, the method includes ascertaining whether the user is included in a user table. For instance, the user table may be maintained to identify the interested users for receiving notification of the occurrence of any event related to the object. In the user table, the event may be recorded with attributes comprising an object identifier, a user identifier, a notification type, and a frozen flag.

At step 806, upon ascertaining that the user is not included in the user table and the user's entry is not frozen, the method includes adding the user in the user table. In an example, the user is provided with an object identifier, a user identifier, a notification type, and a frozen flag in the user table.

Then, at step 808, the user may be automatically subscribed to receive a notification of the occurrence of an event for the object.

At step 810, the event type of the timeline table may be mapped with the notification type of the user table for the user. The event type may be at least one of a discussion event, a reference event, and a change event. In an example, when the user modifies an object by creating a discussion event, the notification type for one or more interested users may be a discussion notification and a reference notification. In another example, the user may modify an object by commenting on the object to create a reference event. For the reference event, the comment of the user is parsed to determine one or more users referenced in the comment.

Subsequently, at step 812, the one or more interested users may be notified of the event of the object.

Figure 9:
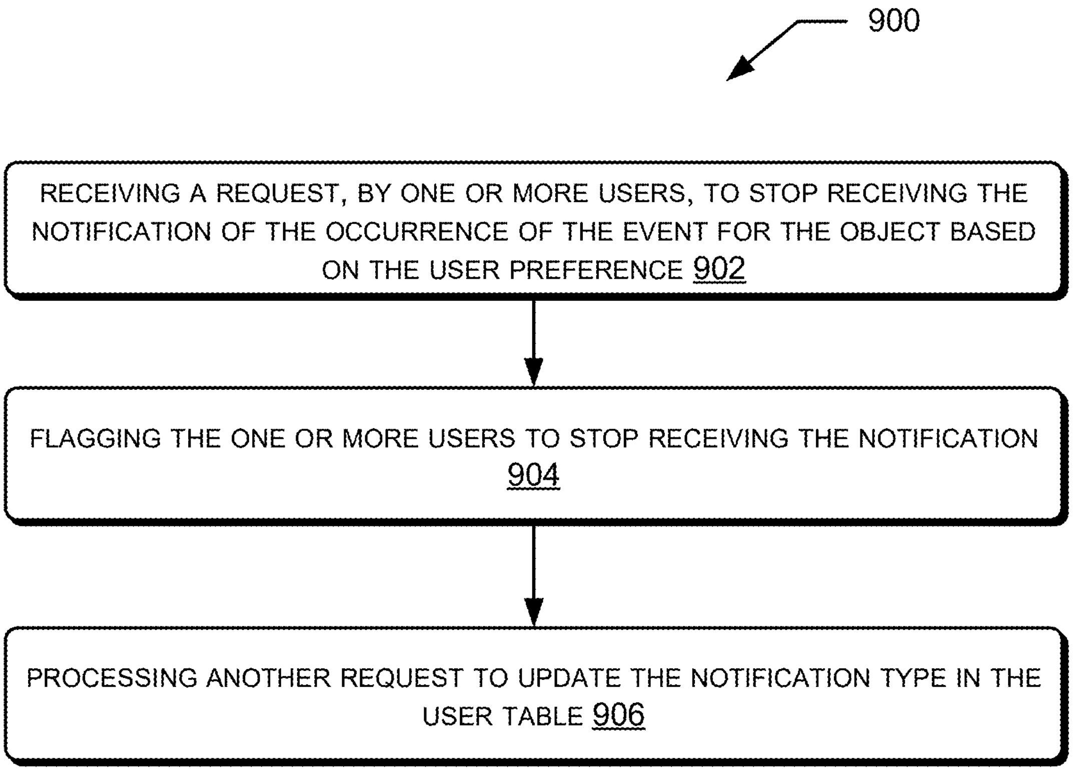
FIG. 9 illustrates a method for updating a notification type in a user table for notifying an event to users for one or more objects, according to an example implementation of the present subject matter.

FIG. 9 illustrates a method 900 for updating a notification type in a user table for notifying an event to users for one or more objects, according to an example implementation of the present subject matter. The order in which the method 900 is described is not intended to be construed as a limitation, and any number of the described method blocks may be combined in any order to implement the method 900, or an alternative method. Furthermore, the method 900 may be implemented by processor(s) or computing device(s) through any suitable hardware, non-transitory machine-readable instructions, or a combination thereof.

It may be understood that steps of the method 900 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 800 may be performed by the system 400.

At step 902, the method includes receiving a request to stop receiving a notification of the occurrence of the event for the object. For instance, one or more users subscribed to receive the notification for the object may request to stop receiving any further notification based on the user preference. In another example, one or more users may want to receive notifications of events for a particular object for a required time period. In such scenarios, one or more users may want to stop receiving notification after their requirement is over and when they are no longer interested in the object.

Then, at step 904, the one or more users may be flagged to stop receiving the notification for the object. In an example, the subscribed users to receive notifications may opt-out from receiving the notifications for the object. For instance, in an opt-out scenario, the notification type is removed from the user's set, and then the "frozen" is set to 'true' to prevent further modifications to the notification types from happening. In another instance, in an opt-out scenario, a flag, such as a notification type, is removed from the subscribed user to stop receiving the notification.

Subsequently, at step 906, the method includes processing the request to update the notification type in the user table.

Figure 10:
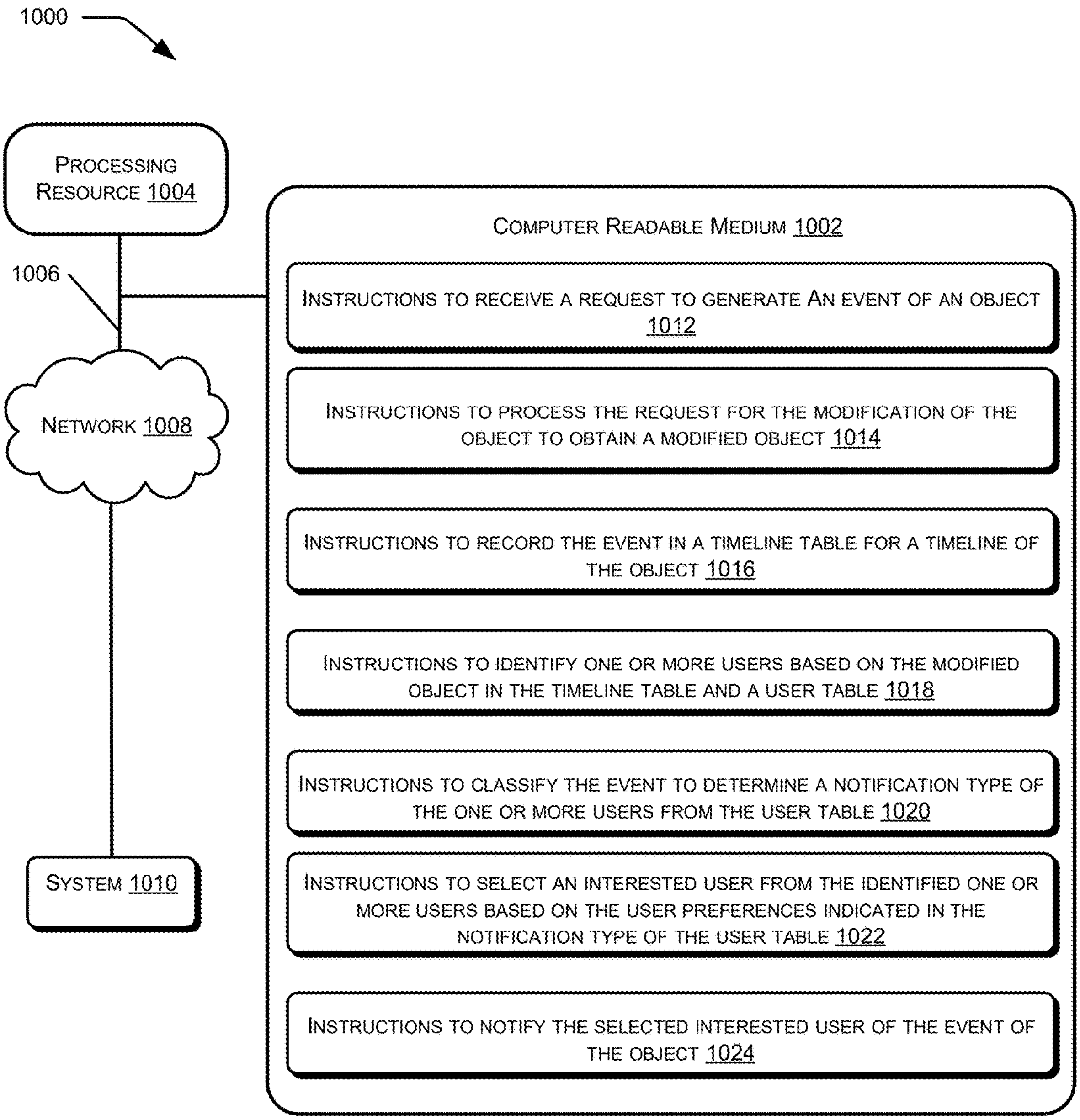
FIG. 10 illustrates a computing environment, implementing a non-transitory computer-readable medium for propagation of events of system of record, according to an example implementation of the present subject matter.

FIG. 10 illustrates a computing environment 1000, implementing a non-transitory computer-readable medium for propagation of events, according to an example implementation of the present subject matter.

In an example, the non-transitory computer-readable medium 1002 may be utilized by the system 1010. The system 1010 may correspond to the system 400. The system 1010 may be implemented in a public networking environment or a private networking environment. In an example, the computing environment 1000 may include a processing resource 1004 communicatively coupled to the non-transitory computer-readable medium 1002 through a communication link 1006.

In an example, the processing resource 1004 may be implemented in a device, such as the system 1010. The non-transitory computer-readable medium 1002 may be, for example, an internal memory device of the system 1010 or an external memory device. In an implementation, the communication link 1006 may be a direct communication link, such as any memory read/write interface. In another implementation, the communication link 1006 may be an indirect communication link, such as a network interface. In such a case, the processing resource 1004 may access the non-transitory computer-readable medium 1002 through a network 1008. The network 1008 may be a single network or a combination of multiple networks and may use a variety of different communication protocols. The processing resource 1004 and the non-transitory computer-readable medium 1002 may also be communicatively coupled to the system 1010 over the network 1008.

In an example implementation, the non-transitory computer-readable medium 1002 includes a set of computer-readable instructions to notify an event to interested users for one or more objects. The set of computer-readable instructions can be accessed by the processing resource 1004 through the communication link 1006 and subsequently executed to perform acts to provide feedback to the actuating object.

Referring to FIG. 10, in an example, the non-transitory computer-readable medium 1002 includes instructions 1012 to receive a request to generate an event. A user, such as one or more clients, may make a request to generate the event. The event may be generated when a modification is made to an object in a system of record. For instance, the modification may be creating an update indicating a change in the object, creating a comment, such as a discussion and a reference in the object, and the like.

The non-transitory computer-readable medium 1002 includes instructions 1014 to process the request for the modification of the object to obtain a modified object. The non-transitory computer-readable medium 1002 includes instructions 1016 to record the event in a timeline table fora timeline of the object. The timeline may be used for recording the history of changes, related events, and discourse associated with the objects in the system of record. In an example, the timeline records the event in the timeline table, as explained with reference to FIG. 5, for a timeline of the object. In the timeline table, the event may be recorded with attributes comprising an object identifier, a timestamp, a user identifier, and an event type. The timeline table illustrates events in the history of the object and may be referenced and iterated efficiently for the object. In an example, the user may make a request to modify the timeline. The modification may include addition of a comment by the user in the timeline table of the object. The timeline table may be then published with the modified object.

The non-transitory computer-readable medium 1002 includes instructions 1018 to identify one or more users based on the modified object in the timeline table and a user table. The one or more users may be users who are interested in receiving notification for the occurrence of any event related to the object. In an example, the one or more users may be users who are already subscribed to receive a notification of the occurrence of the event for the object. The one or more users may also be the users who are referenced in the comment by the user. In an example, a user table may be maintained to identify the one or more users for receiving notification for the occurrence of any event related to the object. In the user table, the event may be recorded with attributes comprising an object identifier, a user identifier, a notification type, and a frozen flag.

The non-transitory computer-readable medium 1002 includes instructions 1020 to classify the event to determine a notification type of the one or more users from the user table. The notification type may indicate a user preference to receive the notification of the occurrence of the event for the object. In an example, as objects are modified, the interested users, such as users that are referenced in the object, users who have created a comment on the object are identified and automatically subscribed to receive notifications. In another example, the subscribed users to receive notifications may opt-out from receiving the notifications for the object. For instance, in an opt-out scenario, the notification type is removed from the user's set, and then the "frozen" is set to 'true' to prevent further modifications to the notification types from happening. In another instance, in an opt-out scenario, a flag, such as a notification type, is removed from the subscribed user to stop receiving the notification.

The non-transitory computer-readable medium 1002 includes instructions 1022 to select all interested users from the identified one or more users based on the user preferences indicated in the notification types of the user table. The non-transitory computer-readable medium 1002 includes instructions 1024 to notify the selected interested user of the event of the object. In an example, the notification service may determine the type of notification to be sent to the selected interested users. For instance, a notification may be a real-time notification.

In the present subject matter, the notification for the events for one or more objects are transmitted reliably to the interested users. Therefore, the present subject matter ensures that the one or more users, subscribed to the object, receive the notification of occurrence of an event for the object. The present subject matter may efficiently monitor a subset of events and may generate notifications from modified objects derived from an object's timeline, thereby increasing the efficiency of the system.

Furthermore, each object in a system of record in the present subject matter is handled independently by the system, and therefore scalability of the system is not affected as more objects are added in the system of record. The present subject matter provides a flexible system as the event may be monitored automatically by the system based on object activity without any user intervention. In addition, based on the activity, such as modification of the objects, the interested users, such as users that are referenced in the object, who have created a comment on the object are identified and automatically subscribed to receive notifications. Further, the subscribed users may override the subscribed settings by opting-out of notifications for the object. The present subject matter thus provides a highly scalable and efficient technique for processing and notifying events to appropriate users in an efficient manner.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A system to notify an event for one or more objects deployed in a connected environment having a plurality of distinct ecosystems, the system comprising:
 a processor to:
 receive a request from a user to generate the event, wherein the event is indicative of a modification of an object deployed in the connected environment;
 process the request for the modification of the object to obtain a modified object;
 record the event in a timeline database that records a history of changes associated with objects in the connected environment, wherein the event is recorded in the timeline database in a timeline table comprising attributes corresponding to events in the history of changes to the objects;
 publish the timeline table with the modified object for the user;
 update the event in a user table, wherein an event type of the timeline table is mapped with a notification type in the user table;
 identify one or more linked users based on the modified object in the timeline table and the user table, wherein the one or more linked users include at least one of a user referenced in the modified object and a user subscribed to receive a notification of an occurrence of the event for the object;
 determine the notification type of the one or more linked users in the user table, wherein the notification type indicates a user preference to receive the notification of the occurrence of the event for the object;
 select a user from the one or more linked users based on the user preference; and
 notify the selected user of the event.

2. The system of claim 1, wherein the modification of the object comprises at least one of:
 an update in the object, wherein the update is indicative of a change in the object; and
 a comment in the object; wherein the comment is indicative of at least one of a discussion and a reference in the object.

3. The system of claim 1, wherein the processor is to:
 ascertain whether the user, creating the request for the event, is included in the user table;
 add the user in the user table upon ascertaining that the user is not included in the user table; and
 map the event type of the timeline table with the notification type of the user table for the user.

4. The system of claim 1, wherein the processor is to:
 automatically subscribe the user to receive a notification of an occurrence of an event for the object.

5. The system of claim 1, wherein the processor is to:
 receive another request, by the one or more users, to stop receiving the notification of the occurrence of the event for the object based on the user preference;
 flag the one or more users to stop receiving the notification; and
 process another request to update the notification type in the user table.

6. The system of claim 1, wherein the processor is to:
 determine the event type, wherein the event type comprises at least one of a discussion event, a reference event, and a change event; and
 determine the notification type associated with the event type.

7. A method for notifying an event for one or more objects deployed in a connected environment having a plurality of distinct ecosystems, the method comprising:
 receiving a request from a user to generate the event, wherein the event is indicative of a modification of an object deployed in the connected environment;
 processing the request for the modification of the object to obtain a modified object;
 recording the event in a timeline database that records a history of changes associated with objects in the connected environment, wherein the event is recorded in the timeline database in a timeline table comprising attributes corresponding to events in the history of changes to the objects;
 publishing the timeline table with the modified object for the user;
 updating the event in a user table, wherein an event type of the timeline table is mapped with a notification type in the user table;
 identifying one or more linked users based on the modified object in the timeline table and the user table, wherein the one or more linked users include at least one of a user referenced in the modified object and a user subscribed to receive a notification of an occurrence of the event for the object;
 determining the notification type of the one or more linked users in the user table, wherein the notification type indicates a user preference to receive the notification of the occurrence of the event for the object;
 selecting a user from the one or more linked users based on the user preference; and
 notifying the selected user of the event.

8. The method of claim 7, wherein the modification of the object comprises at least one of:
 creating an update in the object, wherein the update is indicative of a change in the object; and
 creating a comment in the object; wherein the comment is indicative of at least one of a discussion and a reference in the object.

9. The method of claim 7, further comprising:
 ascertaining whether the user, creating the request for the event, is included in the user table;
 adding the user in the user table upon ascertaining that the user is not included in the user table; and
 mapping the event type of the timeline table with the notification type of the user table for the user.

10. The method of claim 7, further comprising:
 automatically subscribing the user to receive a notification of an occurrence of an event for the object.

11. The method of claim 7, further comprising:
 receiving another request, by the one or more users, to stop receiving the notification of the occurrence of the event for the object based on the user preference;
 flagging the one or more users to stop receiving the notification; and
 processing another request to update the notification type in the user table.

12. The method of claim 7, wherein for notifying the selected user of the event, the method comprises:
 determining the event type, wherein the event type comprises at least one of a discussion event, a reference event, and a change event; and determining the notification type associated with the event type.

13. A non-transitory computer-readable medium comprising instructions to notify an event for one or more objects deployed in a connected environment having a plurality of distinct ecosystems, the instructions being executable by a processing resource to:

receive a request from a user to generate the event, wherein the event is indicative of a modification of an object deployed in the connected environment;

process the request for the modification of the object to obtain a modified object;

record the event in a timeline database that records a history of changes associated with objects in the connected environment, wherein the event is recorded in the timeline database in a timeline table comprising attributes corresponding to events in the history of changes to the objects;

publish the timeline table with the modified object for the user;

update the event in a user table, wherein an event type of the timeline table is mapped with a notification type in the user table;

identify one or more linked users based on the modified object in the timeline table and the user table, wherein the one or more linked users include at least one of a user referenced in the modified object and a user subscribed to receive a notification of an occurrence of the event for the object;

determine the notification type of the one or more linked users in the user table, wherein the notification type indicates a user preference to receive the notification of the occurrence of the event for the object;

select a user from the one or more linked users based on the user preference; and notify the selected user of the event.

14. The non-transitory computer-readable medium of claim 13, wherein the modification of the object comprises at least one of:

an update in the object, wherein the update is indicative of a change in the object; and a comment in the object; wherein the comment is indicative of at least one of a discussion and a reference in the object.

15. The non-transitory computer-readable medium of claim 13, wherein the processor is to:

ascertain whether the user, creating the request for the event, is included in the user table;

add the user in the user table upon ascertaining that the user is not included in the user table; and map the event type of the timeline table with the notification type of the user table for the user.

16. The non-transitory computer-readable medium of claim 13, wherein the processor is to:

automatically subscribe the user to receive a notification of an occurrence of an event for the object.

17. The non-transitory computer-readable medium of claim 13, wherein the processor is to:

receive another request, by the one or more users, to stop receiving the notification of the occurrence of the event for the object based on the user preference;

flag the one or more users to stop receiving the notification; and process another request to update the notification type in the user table.

18. The non-transitory computer-readable medium of claim 13, wherein the processor is to:

determine the event type, wherein the event type comprises at least one of a discussion event, a reference event, and a change event; and determine the notification type associated with the event type.

* * * * *